(12) United States Patent
Lo

(10) Patent No.: US 6,317,923 B1
(45) Date of Patent: Nov. 20, 2001

(54) HANDLE MIDDLE TUBE AND A VERTICAL TUBE CONTAINING DEVICE FOR SKATE-SCOOTERS

(76) Inventor: Albert Chong-Jen Lo, 3023, Windy Knoll Ct., Rockville, MD (US) 20850

( * ) Notice: Subject to any disclaimer, the term of this patent is extended or adjusted under 35 U.S.C. 154(b) by 0 days.

(21) Appl. No.: 09/603,111

(22) Filed: Jun. 22, 2000

(51) Int. Cl.⁷ ............................... B62B 7/00; B62K 15/00
(52) U.S. Cl. .............................. 16/110.1; 16/436; 16/421; 16/900; 16/429; 280/655; 280/47.371; 280/87.041; 280/87.05
(58) Field of Search .............................. 16/436, 438, 900, 16/409, 410, 110.1, DIG. 41, 405, 429, 113.1, 421; 280/655, 47.371, 87.041, 87.05; 403/243, 252, 263, 361, 169, 170, 174, 187, 292

(56) References Cited

U.S. PATENT DOCUMENTS

| | | | |
|---|---|---|---|
| 5,287,869 | * | 2/1994 | Wu ........................................ 403/373 |
| 5,515,744 | * | 5/1996 | Liao ....................................... 403/373 |
| 5,940,933 | * | 8/1999 | Chang ............................. 16/DIG. 41 |
| 6,173,976 | * | 1/2001 | Lee ..................................... 280/87.05 |
| 6,202,282 | * | 3/2001 | Holdsworth ......................... 403/362 |
| 6,213,672 | * | 4/2001 | Varga ................................ 403/109.2 |
| 6,227,752 | * | 5/2001 | Friedrich .............................. 403/192 |

* cited by examiner

*Primary Examiner*—Chuck Y. Mah
(74) *Attorney, Agent, or Firm*—Pro-Techtor International Services

(57) ABSTRACT

A handle middle tube and a vertical tube-combining device for skate-scooters includes a handle middle tube provided with a large hole and small hole of different centers and a vertical groove. The large hole is located on the small hole, and a recess is formed in an intermediate bottom of the handle middle tube and being higher than the diameter of the small hole. The recess has a stop wall on an upper end surface to stop an upper end of the vertical tube when it fits in the recess. The vertical tube has two holes in the upper end aligned to the small hole of said handle middle tube. Or two grips fitting in two ends of the handle middle tube have respectively a small hole in an inner end edge and communicating with the lateral holes of the vertical tube. These two kinds of combining structures enable an elongate pin to extend through the small hole and the lateral holes of the vertical tube and the two ends of the pin expose out of the vertical tube so as to combine the handle middle tube with the vertical groove easily.

6 Claims, 5 Drawing Sheets

HANDLE MIDDLE TUBE AND A VERTICAL TUBE CONTAINING DEVICE FOR SKATE-SCOOTERS

BACKGROUND OF THE INVENTION

This invention relates to a handle middle tube and a vertical tube-combining device for skate-scooters, particularly to one saving time and work and cost.

A conventional skate-scooter has a handle middle tube 10 and a vertical tube 20 combined with the middle tube 10, as shown in FIG. 1. The middle tube 10 horizontally located has its intermediate bottom contacting an upper end of the vertical tube 20, and then welded together with a spot welding machine, so it takes time and high cost, and in addition, the welded spots look awkward as well. In treating their surfaces, they are impossible to take off to treat separately.

The both cannot be treated with their surfaces until they are welded together, limited in their manufacturing process. Another combining device for the handle middle tube and the vertical tube for a skate-scooter is to bore a hole in both the tubes and screwed tightly together with a bolt. Then the holes have to be bored in advance, and then the bolt protrudes out of the tube walls, also looking awkward.

SUMMARY OF THE INVENTION

The objective of the invention is to offer a handle middle tube and a vertical tube combining device for skate-scooters, easy and quick to assemble and disassemble, and saving cost as well.

BRIEF DESCRIPTION OF DRAWINGS

This invention will be better understood by referring the accompanying drawings, wherein.

DETAILED DESCRIPTION OF THE PREFERRED EMBODIMENTS

Figure 1:
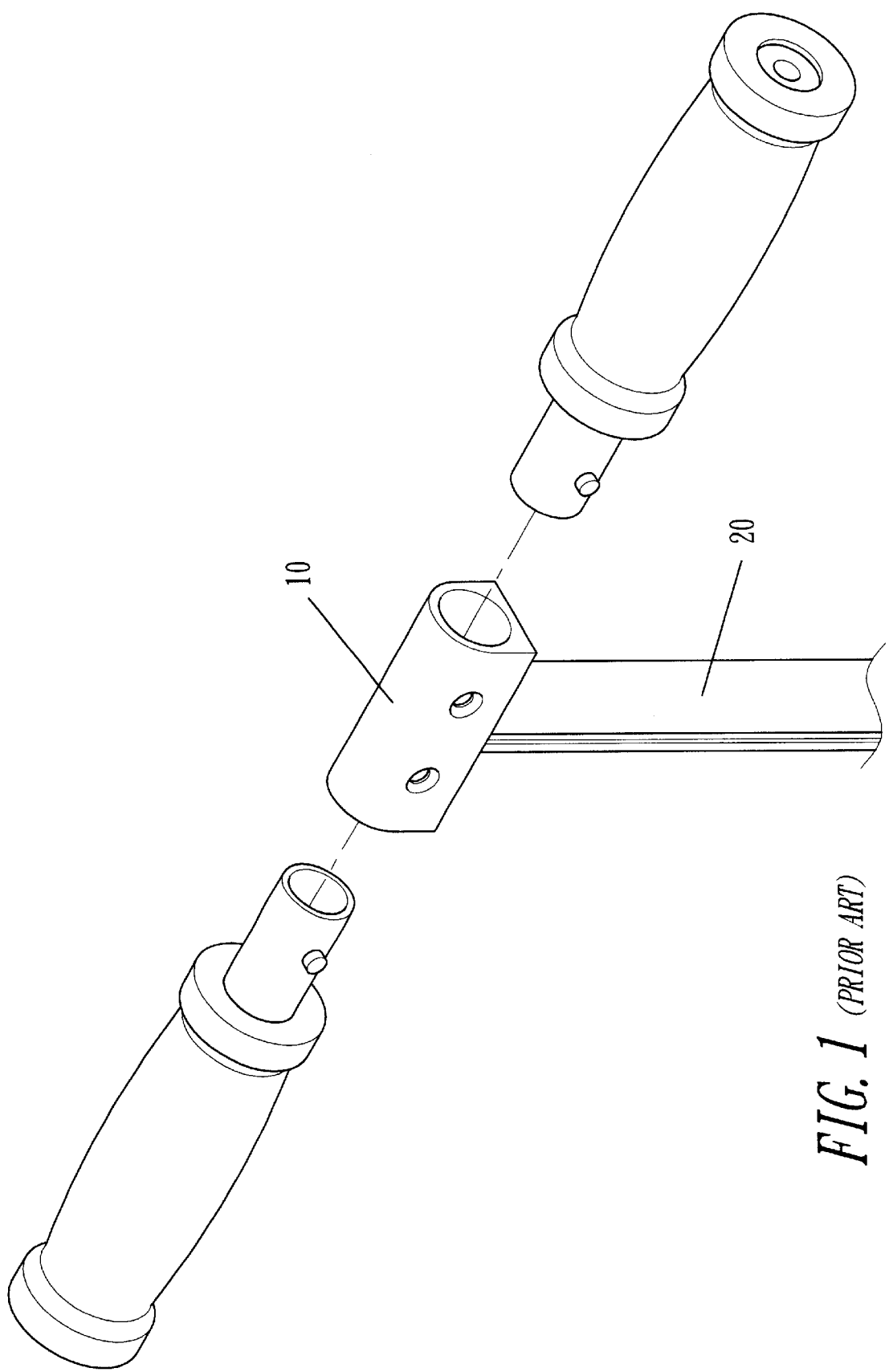
FIG. 1 is a perspective view of a conventional handle middle tube and a vertical tube combined in a skate-scooter.
Figure 2:
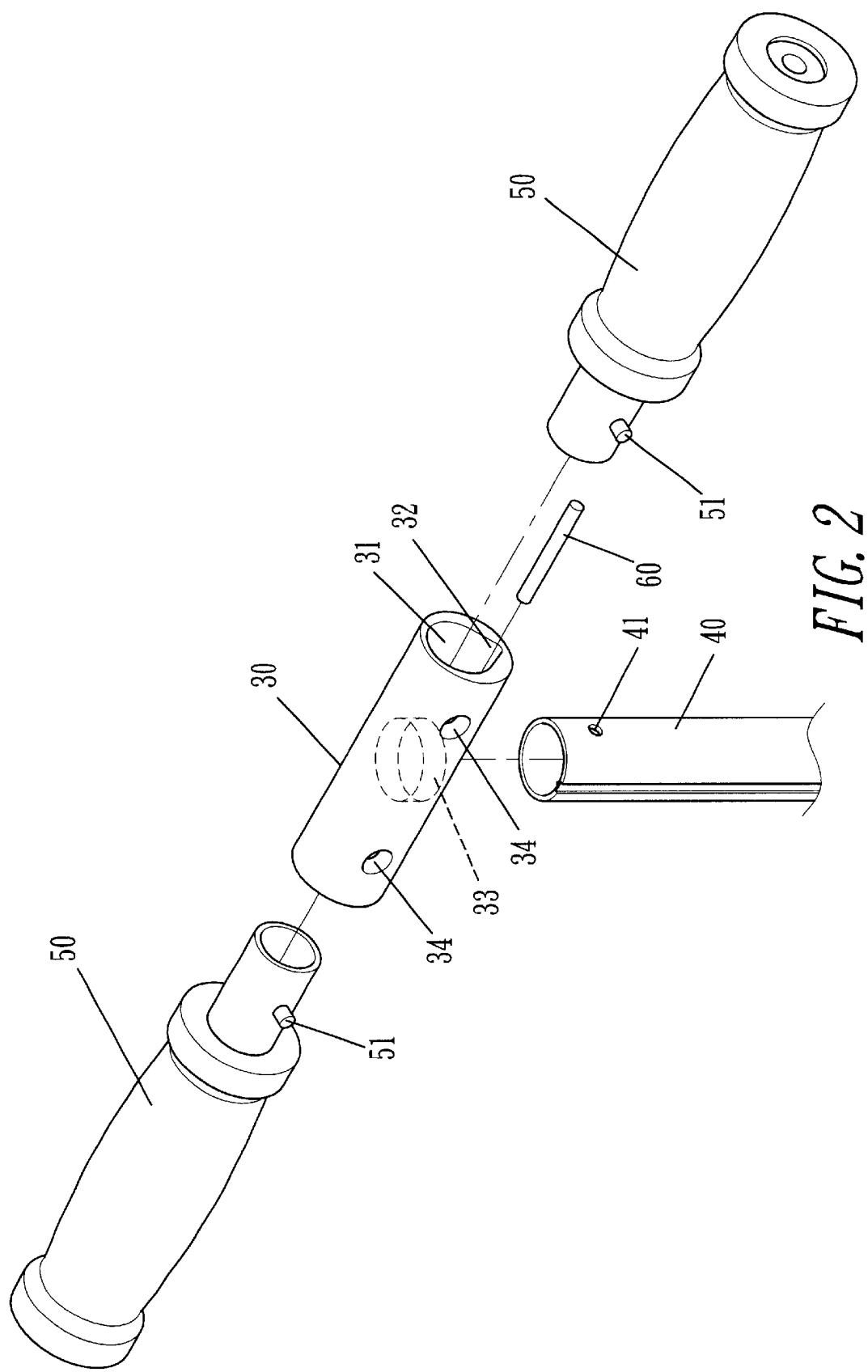
FIG. 2 is an exploded perspective view of a first embodiment of a handle middle tube and a vertical tube-combining device for skate-scooters in the present invention.
Figure 3:
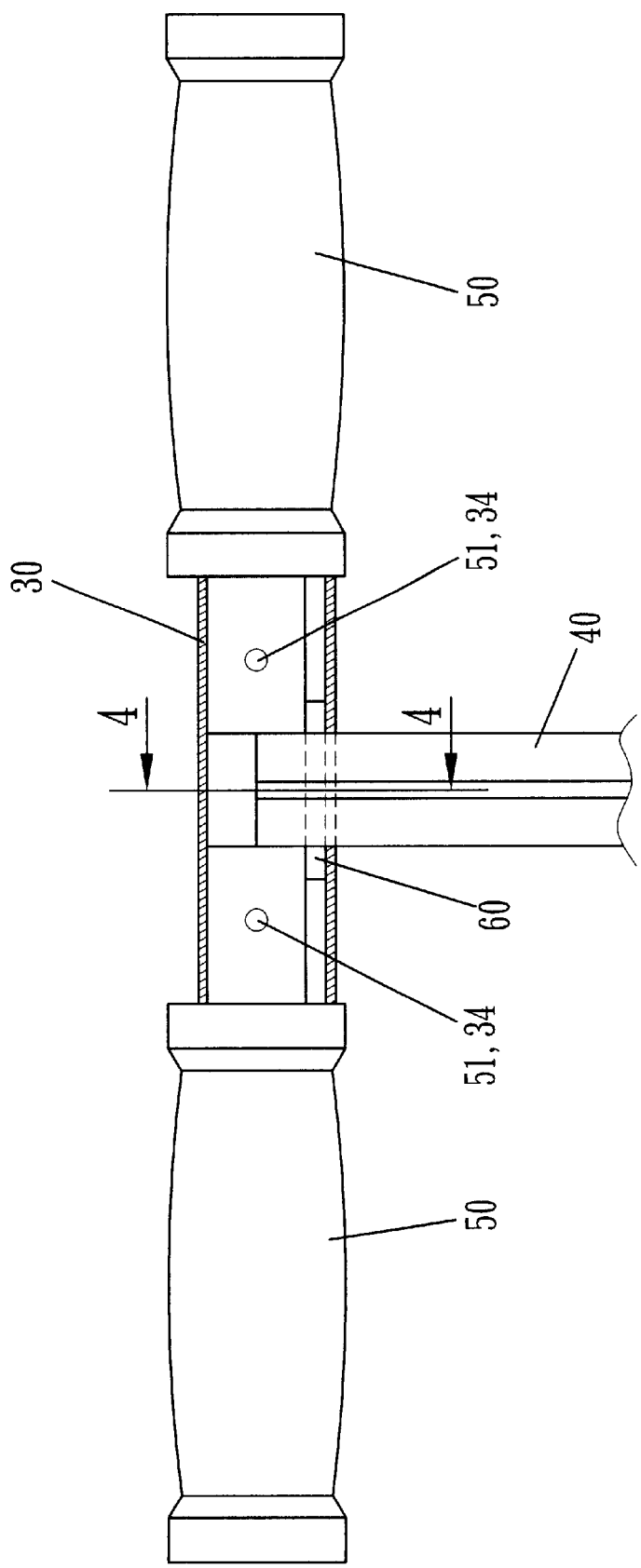
FIG. 3 is a cross-sectional view of the first embodiment of a handle middle tube and the vertical tube combined together in the present invention.
Figure 4:
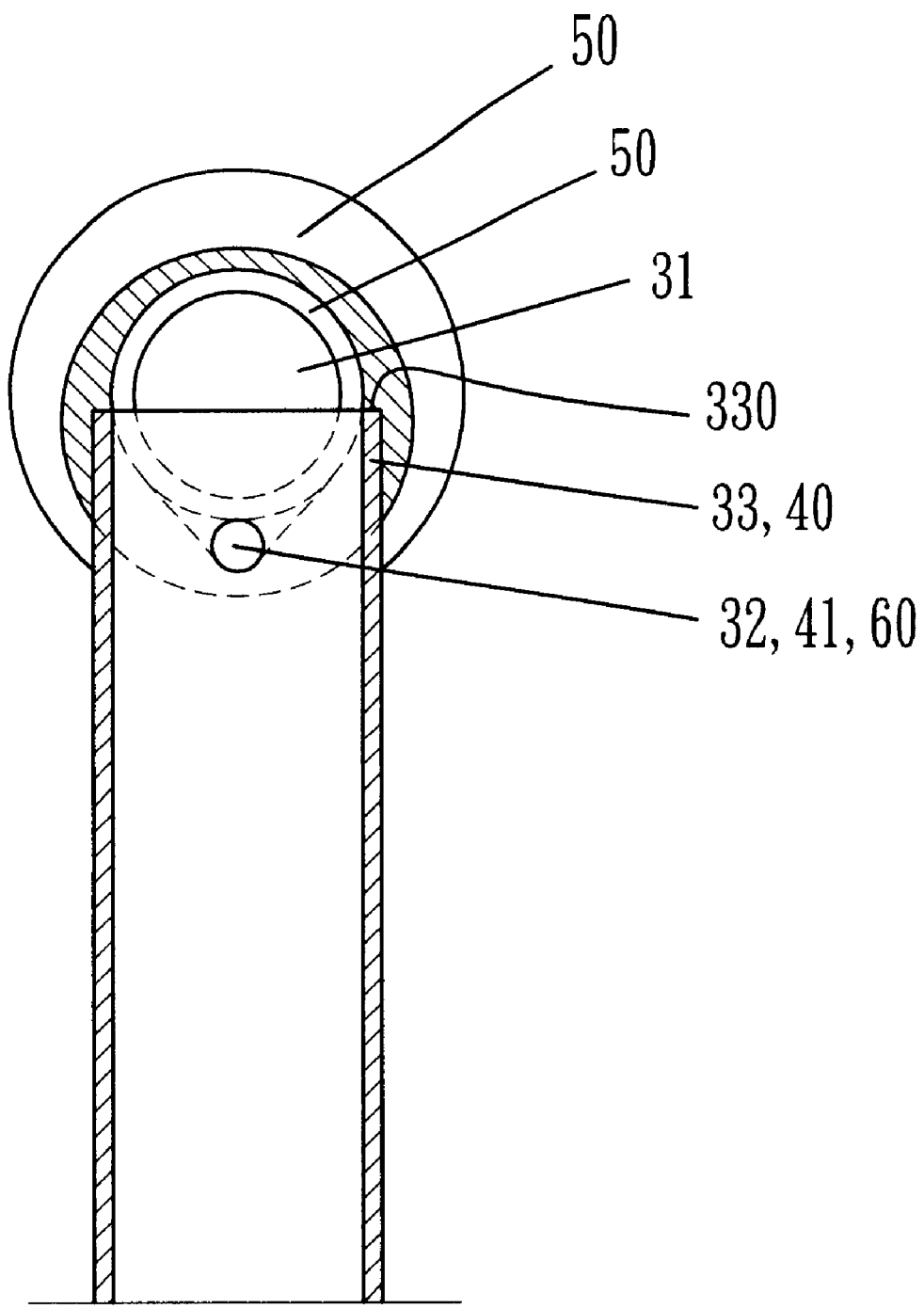
FIG. 4 is a cross-sectional view of the line 4—4 in FIG. 3.

A first embodiment of a handle middle tube and a vertical tube-combining device for skate-scooters in the present invention, as shown in FIGS. 2 and 3, includes a handle middle tube 30 having two ends for a grip 50 respectively to fit therein in a horizontal direction, and a vertical tube 40 combined with the handle middle tube 30. The handle middle tube 30 has a cross-section with two round holes 31, 32 of different centers formed side by side, looking like a water drop as shown in FIG. 4. The large hole 31 is located just on the small hole 32 without or with a wall. Further, the handle middle tube 30 has a circular recess 33 formed in an intermediate bottom, and the upper end surface of the circular recess 33 forms a stop wall 330 as shown in FIG. 4. The height of the circular recess 33 is a little higher than the diameter of the small hole 32.

The vertical tube 40 has an upper end fitting in the circular recess 33 of the handle middle tube 30 and contacting and stopped by the stop wall 330, having two lateral small holes 41 in the wall aligned to the small hole 32 of the handle middle tube 30 for an elongate pin 60 to fit through the small hole 30 first and then through the lateral small holes 41 of the vertical tube 40 to protrude out of the hole 41 so as to keep the vertical tube from slip off the handle middle tube 30.

Figures 5, 6:
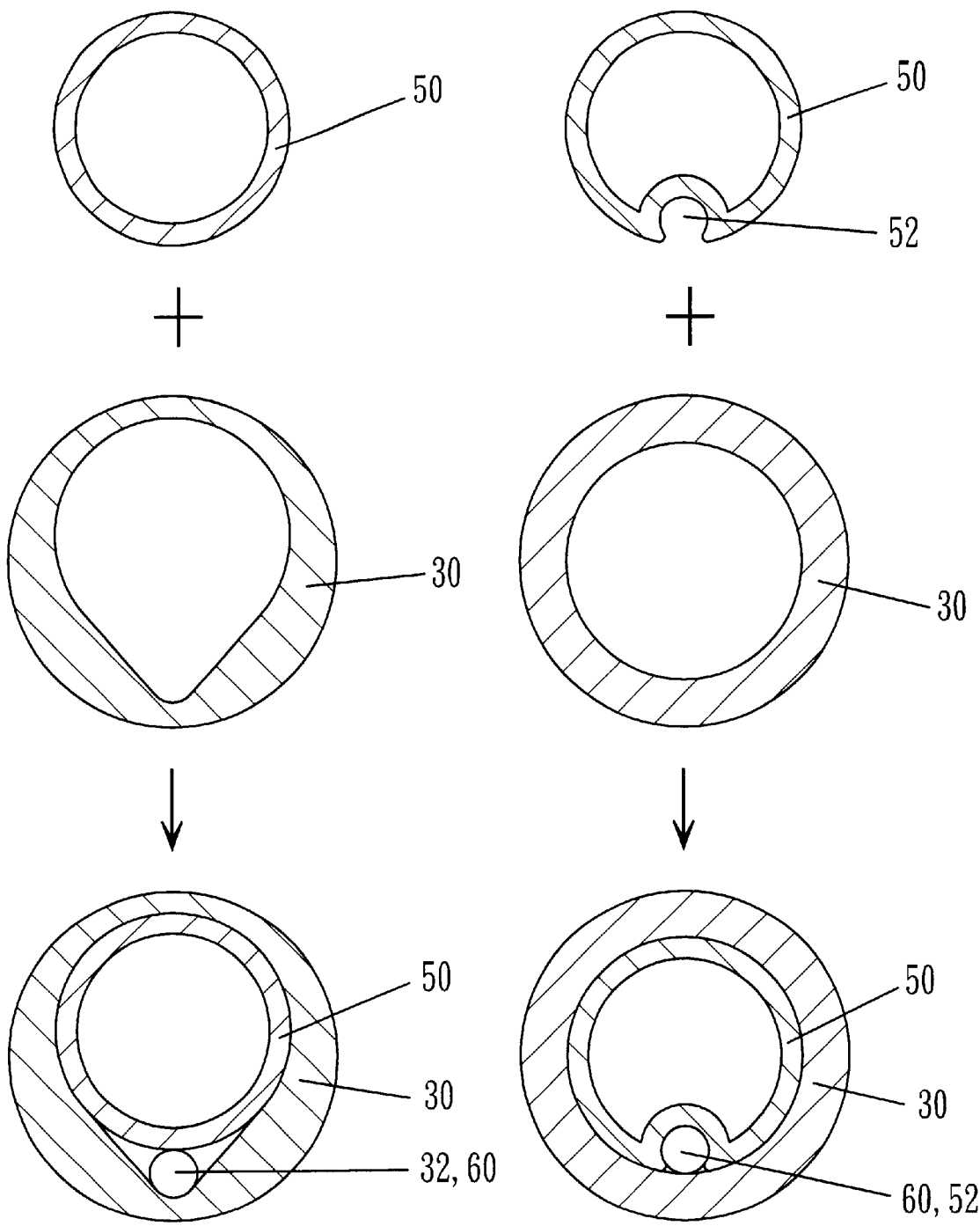
FIG. 5 is a cross-sectional view of the handle middle tube and the vertical tube in the first embodiment in the present invention: and, FIG. 6 is a cross-sectional view of the handle middle tube and the vertical tube in a second embedment in the present invention.

The combining structure of the handle middle tube 30 and the vertical tube 40 constitutes combining stability by means of the vertical tube 30 having the upper end fitting in the recess 33 and stopped by the stop wall 330 and then secured with the handle middle tube 30 with the elongate pin 60 extending through the holes 32 and 41, as shown in FIGS. 4 and 5. So it does not depend on welding, making assembly and disassembly swift and simple. In addition, the handle middle tube 30 and the vertical tube can be treated with their surface separately, facilitating manufacturing processes smooth and alterable.

Next, two grips 50 are combined with the handle middle tube 30 by means of an elastic stub 51 laterally provided on the two grips 50 to engage two lateral holes 34 in the handle middle tube. But in this first embodiment, the two lateral holes 34 are located so as to make the distance between the vertical tube 40 and the lateral hole 34 equal to the distance of the grip 50 fitting in the handle middle tube 30. When the grip 50 is to be combined with the middle tube 30, first the elastic stud 51 is turned to face downward, and fitting and moving along the small hole 32 in the middle tube 30, and then turning the grip 50 for 90 degrees when the inner end of the grip 50 comes to contact the wall of the vertical wall 40, aligning and engaging the elastic stud 51 with the lateral hole 34. Then the two grips 50 are combined with the middle tube 30, without need of compressing the elastic stud 51 and then extending the grip 50 in the middle tube 30 in the conventional one.

FIG. 6 shows a second embodiment of the invention, showing the cross-sectional view of the middle tube 30 and the vertical tube 50. The main difference from the first embodiment is the middle tube 30 have the inner circular hole as the conventional one, but has a small hole 52 separated with a wall from the inner hole of the middle tube, and the small hole 52 communicates with the lateral hole 41 of the recess 33 of the middle tube 30 for the elongate pin 60 to extending through the small hole 51 and the lateral holes 41, as shown in FIG. 6, securing the vertical tube 40 with the middle tube 30 stably.

The invention has the following advantages, as understood from the aforesaid description.
1. Combining the middle tube and the vertical tube is simple, without need of welding, lowering the cost.
2. The middle tube and the vertical tube can be separately treated with the surface, and then combined together, smoothing manufacturing processes.
3. The two grips 50 and the middle tube 30 can be combined together more easily.

While the preferred embodiments of the invention have been described above, it will be recognized and understood that various modifications may be made therein and appended claims are intended to cover all such modifications that may fall within the spirit and scope of the invention.

I claim:

1. A handle middle tube and a vertical tube combining device for skate-scooters comprising:

a handle middle tube having a central though hole, said central throughway includes a circular main passage with a circular recess at a lower side thereof, such that said central throughway is teardrop shaped, said handle middle also comprises a receiving recess on a lower surface of said handle middle tube, a vertical tube having an upper end that is received in said receiving recess of said handle middle tube, said vertical tube contacts an upper stop wall of said recess, said vertical tube further comprises two lateral holes bored in side walls of said vertical tube, said lateral holes are aligned with said circular recess of said handle middle tube such that an elongate pin inserted into a first one of said lateral holes extends through said circular recess of said handle middle tube and then through a second one of said lateral holes, two ends of said elongate pin being exposed at sides of said vertical tube; such that said vertical tube is connected to said handle middle tube by means of said upper end of said vertical tube being received in said receiving recess of said handle middle tube, said upper end of said vertical tube contacting said stop wall of said receiving recess of said handle middle tube, said vertical tube being secured in position by said elongate pin passing through said lateral holes.

2. The combining device as claimed in claim 1, wherein:

cross sections of said circular main passage and said circular recess are eccentric circles.

3. The combining device as claimed in claim 1, wherein:

two lateral holes in said handle middle tube are located at sides of said receiving recess, a distance between each said lateral hole and said upper end of said vertical tube is equal to a distance between an inner end of each of a pair of grips received in said handle middle tube and each said lateral hole.

4. The combining device as claimed in claim 1, wherein:

said circular main passage and said circular recess are in communication with each other.

5. The combining device as claimed in claim 1, wherein:

said circular main passage and said circular recess are separated by a wall.

6. A handle middle tube and the vertical tube combining device for skate-scooters comprising:

a handle middle tube having a recess formed in a bottom surface thereof, recess having a stop wall formed at an inner end of said recess, a vertical tube with an upper end received in said recess of said middle tube, said upper end of said vertical tube contacting said stop wall, said vertical tube includes two aligned holes formed in said upper end and aligned with two lateral holes of said handle middle tube, a grip received in each of two ends of said handle middle tube, each said grip having a small hole formed in an inner wall and aligning with said lateral holes of said vertical tube, and an elongate pin extending through said small hole of said handle middle tube and through said lateral holes of said vertical tube to secure said vertical tube to said handle middle tube.

* * * * *